US012515873B2

(12) United States Patent
Shima et al.

(10) Patent No.: US 12,515,873 B2
(45) Date of Patent: Jan. 6, 2026

(54) HOUSING BOX

(71) Applicant: Hitachi High-Tech Corporation, Tokyo (JP)

(72) Inventors: Yuki Shima, Tokyo (JP); Takenori Okusa, Tokyo (JP); Tsukasa Suenari, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 81 days.

(21) Appl. No.: 18/273,117

(22) PCT Filed: Nov. 25, 2021

(86) PCT No.: PCT/JP2021/043113
§ 371 (c)(1),
(2) Date: Jul. 19, 2023

(87) PCT Pub. No.: WO2022/195966
PCT Pub. Date: Sep. 22, 2022

(65) Prior Publication Data

US 2024/0076118 A1 Mar. 7, 2024

(30) Foreign Application Priority Data

Mar. 16, 2021 (JP) ................................ 2021-042224

(51) Int. Cl.
*B65D 81/05* (2006.01)
*B65D 1/36* (2006.01)
(Continued)

(52) U.S. Cl.
CPC ............... *B65D 85/38* (2013.01); *B65D 1/36* (2013.01); *B65D 43/162* (2013.01); *B65D 51/26* (2013.01);
(Continued)

(58) Field of Classification Search
CPC ...... B65D 75/32; B65D 43/162; B65D 43/16; B65D 2575/329; B65D 25/10;
(Continued)

(56) References Cited

U.S. PATENT DOCUMENTS 2,887,215 A * 5/1959 Hutchison ............ B65D 81/133 206/586
3,013,656 A 12/1961 Murphy, Jr.
(Continued)

FOREIGN PATENT DOCUMENTS

JP 35-000445 Y1 1/1960
JP 03-044556 A 2/1991
(Continued)

OTHER PUBLICATIONS

International Search Report of PCT/JP2021/043113 dated Jan. 11, 2022.
(Continued)

*Primary Examiner* — Mollie Impink
(74) *Attorney, Agent, or Firm* — MATTINGLY & MALUR, PC

(57) ABSTRACT

There is provided a housing box that prevents breakage of a rod-shaped member like a nozzle use for an automatic analyzer at the time of transportation. A housing box in which a rod-shaped member used for an automatic analyzer is housed, the housing box includes: a base provided with a housing part in a groove shape on which the rod-shaped member is placed; and a cover put on the base, wherein the housing part has a step on which a projection is caught, the projection being provided on a bottom of the rod-shaped member, the projection projecting in a radial direction, and a space between a tip end and an inner wall of the rod-shaped member.

7 Claims, 8 Drawing Sheets

(51) Int. Cl.

| | |
|---|---|
| ***B65D 43/16*** | (2006.01) |
| ***B65D 51/26*** | (2006.01) |
| ***B65D 85/24*** | (2006.01) |
| ***B65D 85/38*** | (2006.01) |
| *G01N 35/10* | (2006.01) |

(52) U.S. Cl.
CPC ............ *B65D 81/05* (2013.01); *B65D 85/24* (2013.01); *B65D 2543/00194* (2013.01); *G01N 35/1002* (2013.01); *G01N 2035/103* (2013.01)

(58) Field of Classification Search
CPC .......... B65D 85/20; B65D 2543/00398; B65D 2543/00194; B01L 2200/16; A61B 50/30; A61B 50/33
USPC .................................................. 206/571, 305
See application file for complete search history.

(56) References Cited

U.S. PATENT DOCUMENTS 3,305,084 A * 2/1967 Higgins ................ A61M 5/002 206/807
5,293,993 A 3/1994 Yates, Jr. et al.
5,407,070 A 4/1995 Bascos et al.
6,367,624 B1 * 4/2002 Szczepanski ........ B65D 81/133 206/443
8,329,119 B2 * 12/2012 Pearcy ............... G01N 35/1002 422/514
10,172,682 B2 * 1/2019 Van Der Raad-Meijer ................ B65D 75/366
2006/0195036 A1 8/2006 Nakamura
2011/0127294 A1 6/2011 Pearcy et al.
2018/0057211 A1 * 3/2018 Martinson ............ B65D 51/249

FOREIGN PATENT DOCUMENTS

JP 2006-238169 A 9/2006
JP 3171968 U 11/2011
JP 2014162532 A * 9/2014
WO 2017/220795 A1 12/2017

OTHER PUBLICATIONS

Extended European Search Report received in corresponding European Application No. 21931709.6 dated Jan. 27, 2025.

* cited by examiner

HOUSING BOX

TECHNICAL FIELD

The present invention relates to a housing box.

BACKGROUND ART

An automatic analyzer is an analyzer that automatically qualitatively or quantitatively analyzes specific components contained in a sample such as blood or urine. In the automatic analyzer, a liquid such as a reaction solution in which a sample is reacted with a reagent or a sample is reacted with a reagent is aspirated or discharged using a nozzle. The nozzle has its outer diameter smaller than its length and is easily bent, which is vulnerable to an impact, and thus the nozzle has to be protected from the influence of an impact.

Patent Literature 1 discloses that in order to protect a ferrite antenna, which is vulnerable to an impact, from the influence of an external impact, a ferrite antenna is housed in a housing recess of a case through a cap-shaped antenna frame having elasticity attached to both ends of the ferrite antenna.

CITATION LIST

Patent Literature

Patent Literature 1: Japanese Patent Application Laid-Open No. 2006-238169

SUMMARY OF INVENTION

Technical Problem

However, the cap-shaped antenna frame disclosed in Patent Literature 1 is insufficient to protect the tip end of the nozzle. That is, even though the cap-shaped antenna frame is attached to the tip end of the nozzle, the cap-shaped antenna frame slips over the outer circumferential surface of the nozzle to cause its inner wall to contact the tip end of the nozzle, which possibly leads to breakage at the time of transportation of a housing box in which the nozzle is housed.

Therefore, it is an object of the present invention to provide a housing box that prevents the breakage of a rod-shaped member like a nozzle used for an automatic analyzer at the time of transportation.

Solution to Problem

In order to achieve the above objects, the present invention provides a housing box in which a rod-shaped member used for an automatic analyzer is housed, the housing box comprising: a base provided with a housing part in a groove shape on which the rod-shaped member is placed; and a cover put on the base. In the housing box, the housing part has a step on which a projection is caught, the projection being provided on a bottom of the rod-shaped member, the projection projecting in a radial direction, and a space between a tip end and an inner wall of the rod-shaped member.

Advantageous Effects of Invention

According to the present invention, it is possible to provide a housing box that prevents the breakage of a rod-shaped member like a nozzle used for an automatic analyzer at the time of transportation.

DESCRIPTION OF EMBODIMENTS

In the following, a preferred embodiment of a housing box according to the present invention will be described with reference to the accompanying drawings. Since the housing box houses a rod-shaped member used for an automatic analyzer, first, the automatic analyzer will be described. The automatic analyzer is an analyzer that analyzes a sample using a reaction solution in which a reagent is reacted with a sample such as blood or urine.

Figure 1:
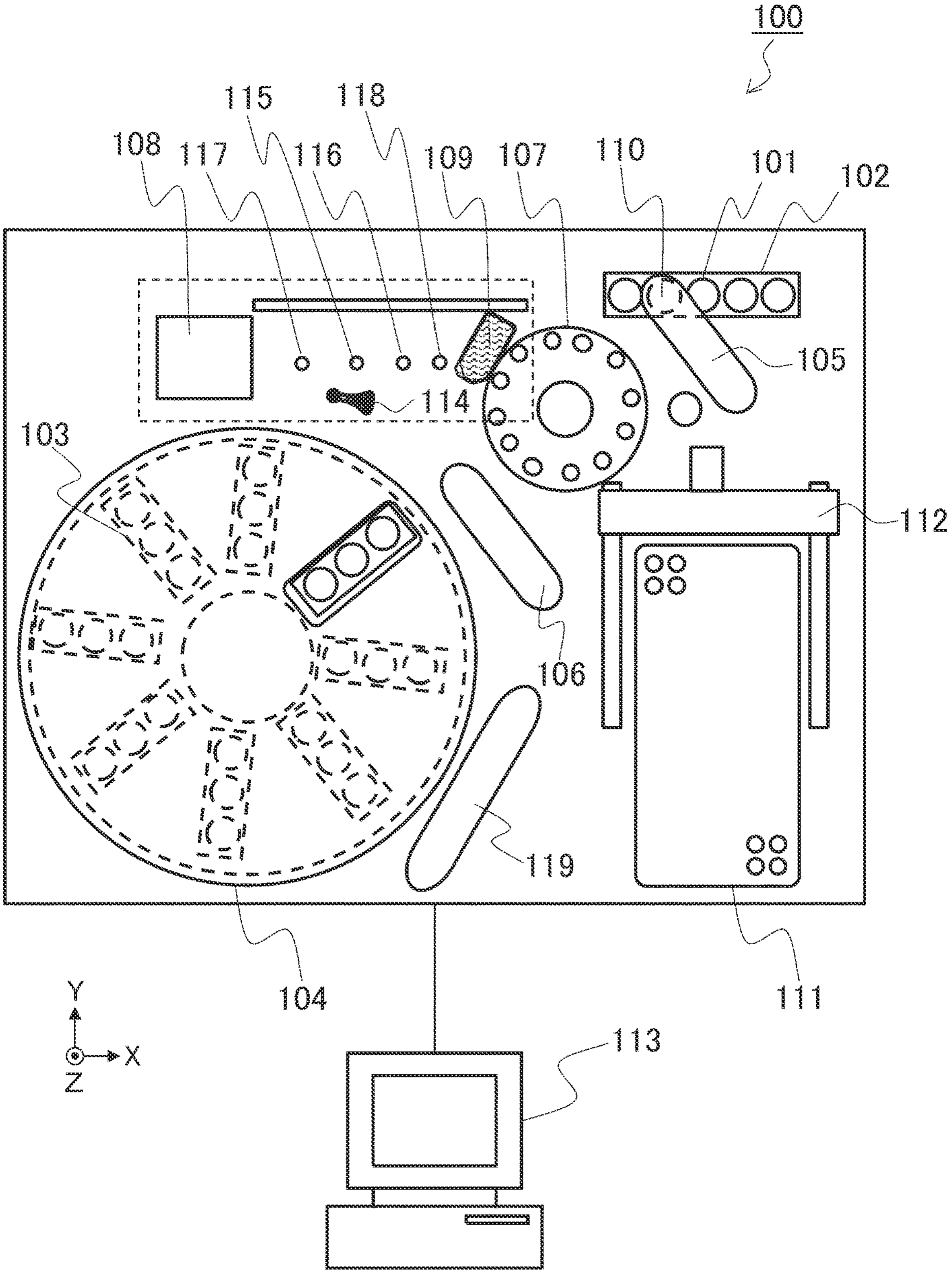
FIG. 1 is a plan view showing an exemplary configuration of an automatic analyzer.

Referring to FIG. 1, an example overall structure of the automatic analyzer will be described. The automatic analyzer includes a sample transport unit 102, a reagent disk 104, a sample dispensing unit 105, a reagent dispensing unit 106, a reagent stirring unit 119, a reaction disk (incubator) 107, a reaction container transport unit 109, a pre-processing unit 114, a measuring unit 108, and a control unit 113. In the following, these units will be described. Note that a vertical direction is a Z-direction, and a horizontal plane is an XY plane.

The sample transport unit 102 transports a sample container 101 in which a sample such as blood or urine is housed to a sample aspiration position 110. The reagent disk 104 stores a reagent container 103 in which a reagent used for analysis is housed at a predetermined temperature range.

The sample dispensing unit 105 dispenses the sample from the sample container 101 transported at the sample aspiration position 110 into a reaction container disposed in the reaction disk 107. To the sample dispensing unit 105, a sample dispensing nozzle, described later, is attached. The reaction container into which the sample is dispensed and a dispensing tip to be attached to the tip end of the sample dispensing nozzle at the time of dispensing the sample are stored in a consumable item storing unit 111, and are transported at a predetermined position by a consumable item transport unit 112.

The reagent dispensing unit 106 dispenses the reagent from the reagent container 103 stored in the reagent disk 104 into the reaction container, which is disposed in the reaction disk 107 and into which the sample is dispensed. To the reagent dispensing unit 106, a reagent dispensing nozzle, described later, is attached. Prior to dispensing the reagent, the reagent stirring unit 119 stirs the reagent containing magnetic particles in the reagent container 103.

The reaction disk 107 promotes the reaction of the sample with the reagent by keeping the temperature of the reaction container into which the sample and the reagent are dispensed at a predetermined temperature range, and generates a reaction solution. The reaction container transport unit 109 transports the reaction container in which the reaction solution is housed from the reaction disk 107 to the reaction solution dispensing position 117 via a pre-processing position 115 and a stirring position 116. At the pre-processing position 115, as pre-processing for the reaction solution housed in the reaction container, the pre-processing unit 114 aspirates a liquid and discharges a buffer solution. To the pre-processing unit 114, a liquid dispensing nozzle and a buffer solution discharge nozzle, described later, are attached. Subsequently, at the stirring position 116, the reaction solution is stirred. At the reaction solution dispensing position 117, a reaction solution dispensing nozzle, described later, supplies the reaction solution from the reaction container to the measuring unit 108.

The measuring unit 108 measures the physical properties of the supplied reaction solution, for example, a light emission quantity, a scattered light quantity, a transmitted light quantity, a current value, a voltage value, and any other parameters. Note that the physical properties to be measured are not limited to these. Moreover, the measuring unit 108 may receive the reaction container from the reaction container transport unit 109, and measure the physical properties of the reaction solution as housed in the reaction container. The reaction container housing the reaction solution whose physical properties are measured by the measuring unit 108 is transported to a waste hole 118 by the reaction container transport unit 109 and discarded. Note that the measured reaction container may be washed and reused.

The control unit 113 is a device that controls the units of the automatic analyzer and executes processing related to measurement, and is configured with a so-called computer, for example.

Referring to FIG. 2A to FIG. 2E, various nozzles, which are rod-shaped members used in the automatic analyzer, will be described. A sample dispensing nozzle 210 exemplified in FIG. 2A has a nozzle main body 211, a protection part 212, and a bending metal plate 213. The nozzle main body 211 is a thin tube in a tubular shape, and aspirates and discharges the sample from its tip end. Although the nozzle main body 211 is made of stainless steel, for example, its outer diameter is smaller than its length, due to which the nozzle main body 211 easily bends. When the tip end is specifically crushed, this leads to a problem in the aspiration or discharge of the sample. In order to protect the nozzle main body 211, specifically in order to suppress the bend of the nozzle main body 211, the protection part 212 is a member in a tubular shape covering the outer circumference of the nozzle main body 211, and is made of stainless steel, for example. Note that since a dispensing tip is attached to the tip end of the nozzle main body 211, the tip end is not covered. The bending metal plate 213 is provided on the opposite side of one end of the sample dispensing nozzle 210, i.e. on the opposite side of the end part to which the dispensing tip is attached. In the following, the end part where the bending metal plate 213 is provided is referred to as a bottom, which is distinguished from the tip end that is the end part from which the sample is aspirated or discharged. Also in the other nozzles, two end parts are distinguished between the tip end and the bottom. Since the bending metal plate 213 functions as a detection plate that detects a connection of the sample dispensing nozzle 210 to the sample dispensing unit 105, the bending metal plate 213 is provided projecting in the radial direction of the sample dispensing nozzle 210.

Figure 2A:
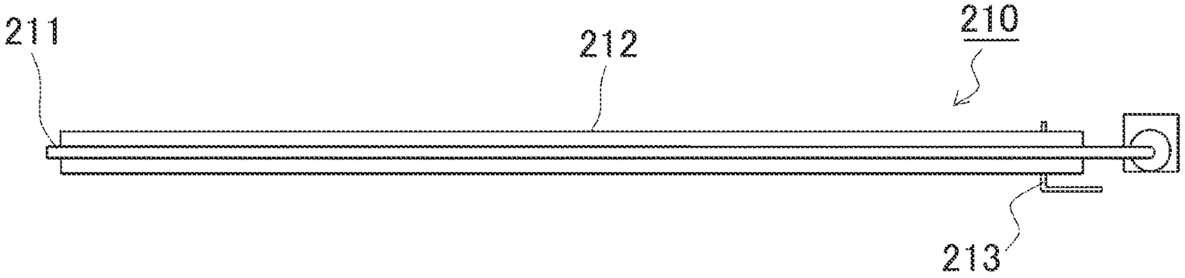
FIG. 2A is a cross sectional view illustrating a sample dispensing nozzle.
Figure 2B:
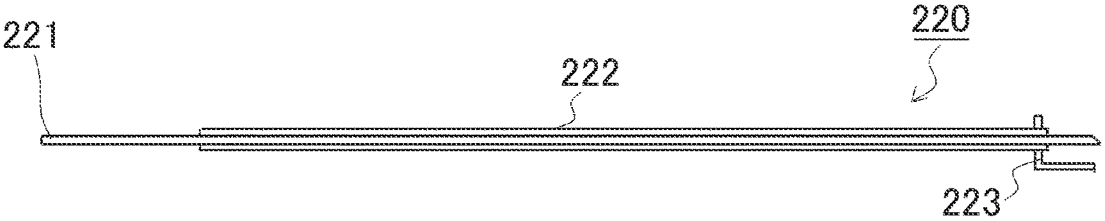
FIG. 2B is a cross sectional view illustrating a reagent dispensing nozzle.

A reagent dispensing nozzle 220 exemplified in FIG. 2B has a nozzle main body 221, a protection part 222, and a bending metal plate 223. The nozzle main body 221 is a thin tube in a tubular shape, and aspirates and discharges the reagent from its tip end. The nozzle main body 221 easily bends similar to the nozzle main body 211. When the tip end is crushed, this leads to a problem in the aspiration or discharge of the reagent. The protection part 222 covers the outer circumference of the nozzle main body 221 in order to protect the nozzle main body 221 similar to the protection part 212. Note that since the tip end of the nozzle main body 221 is inserted into the reagent container 103, the tip end is not covered with the protection part 222. The bending metal plate 223 is provided on the bottom side of the reagent dispensing nozzle 220. Since the bending metal plate 223 functions as a detection plate similar to the bending metal plate 213, the bending metal plate 223 is provided projecting in the radial direction of the reagent dispensing nozzle 220.

Figure 2C:
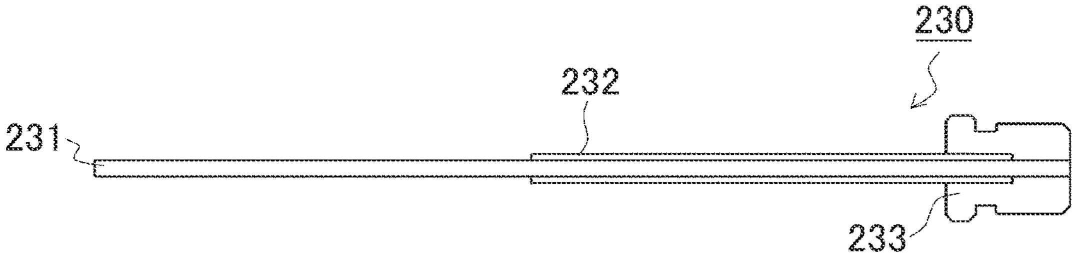
FIG. 2C is a cross sectional view illustrating a liquid aspiration nozzle.

A liquid dispensing nozzle 230 exemplified in FIG. 2C has a nozzle main body 231, a protection part 232, and a flange part 233. The nozzle main body 231 is a thin tube in a tubular shape, and aspirates a liquid in the reaction solution from its tip end. The nozzle main body 231 easily blends similar to the nozzle main body 211. When the tip end is specifically crushed, this leads to a problem in the aspiration of the liquid. The protection part 232 covers the outer circumference of the nozzle main body 231 in order to protect the nozzle main body 231 similar to the protection part 212. Note that since the tip end of the nozzle main body 231 is inserted into the reaction container, the tip end is not covered with the protection part 232.

The flange part 233 is provided on the bottom side of the liquid dispensing nozzle 230. The flange part 233 has a shape exemplified in FIG. 2C such that the tube of the pre-processing unit 114 is attached, and the flange part 233 is provided projecting in the radial direction of the liquid dispensing nozzle 230.

Figure 2D:
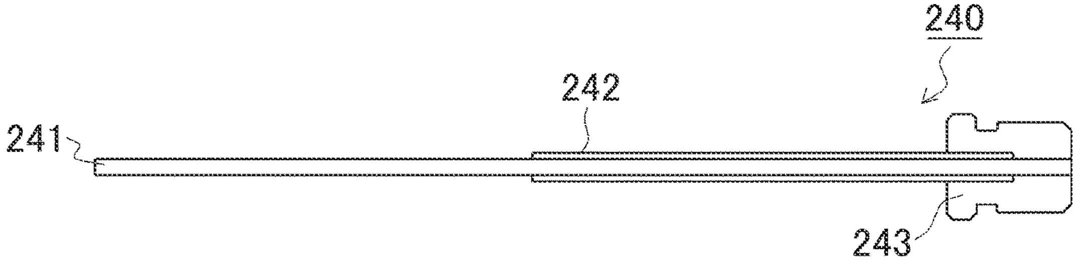
FIG. 2D is a cross sectional view illustrating a buffer solution discharge nozzle.

A buffer solution discharge nozzle 240 exemplified in FIG. 2D has a nozzle main body 241, a protection part 242, and a flange part 243. The nozzle main body 241 is a thin tube in a tubular shape, and discharges the buffer solution from its tip end. The nozzle main body 241 easily bends similar to the nozzle main body 211. When the tip end is specifically crushed, this leads to a problem in the discharge of the buffer solution. The protection part 242 covers the outer circumference of the nozzle main body 241 in order to protect the nozzle main body 241 similar to the protection part 212. Note that since the tip end of the nozzle main body 241 is inserted into the reaction container, the tip end is not covered with the protection part 242. The flange part 243 is provided on the bottom side of the buffer solution discharge nozzle 240. Since the tube of the pre-processing unit 114 is attached to the flange part 243 similar to the flange part 233, the flange part 233 is provided projecting in the radial direction of the buffer solution discharge nozzle 240.

Figure 2E:
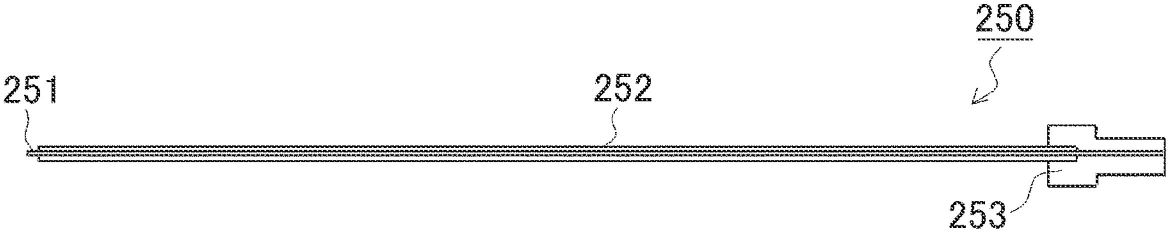
FIG. 2E is a cross sectional view illustrating a reaction solution aspiration nozzle.

A reaction solution dispensing nozzle 250 exemplified in FIG. 2E has a nozzle main body 251, a protection part 252, and a flange part 253. The nozzle main body 251 is a thin tube in a tubular shape, and aspirates the reaction solution having been subjected to pre-processing such as the aspiration of the liquid and the discharge of the buffer solution from its tip end. The nozzle main body 251 easily bends similar to the nozzle main body 211. When the tip end is specifically crushed, this leads to a problem in the aspiration of the reaction solution after pre-processing. The protection part 252 covers the outer circumference of the nozzle main body 251 in order to protect the nozzle main body 251 similar to the protection part 212. Note that since the tip end of the nozzle main body 251 is inserted into the reaction container, the tip end is not covered with the protection part 252. The flange part 253 is provided on the bottom side of the reaction solution dispensing nozzle 250. Since the tube is attached to the flange part 253 similar to the flange part 233, the flange part 253 is provided projecting in the radial direction of the reaction solution dispensing nozzle 250.

These various nozzles that are the rod-shaped members used in the automatic analyzer described above are housed in the housing box, and transported together with the automatic analyzer to be delivered. It is important to prevent the breakage of the various nozzles at the time of transportation, specifically to prevent the breakage of the tip ends of the various nozzles due to contact.

Figure 3:
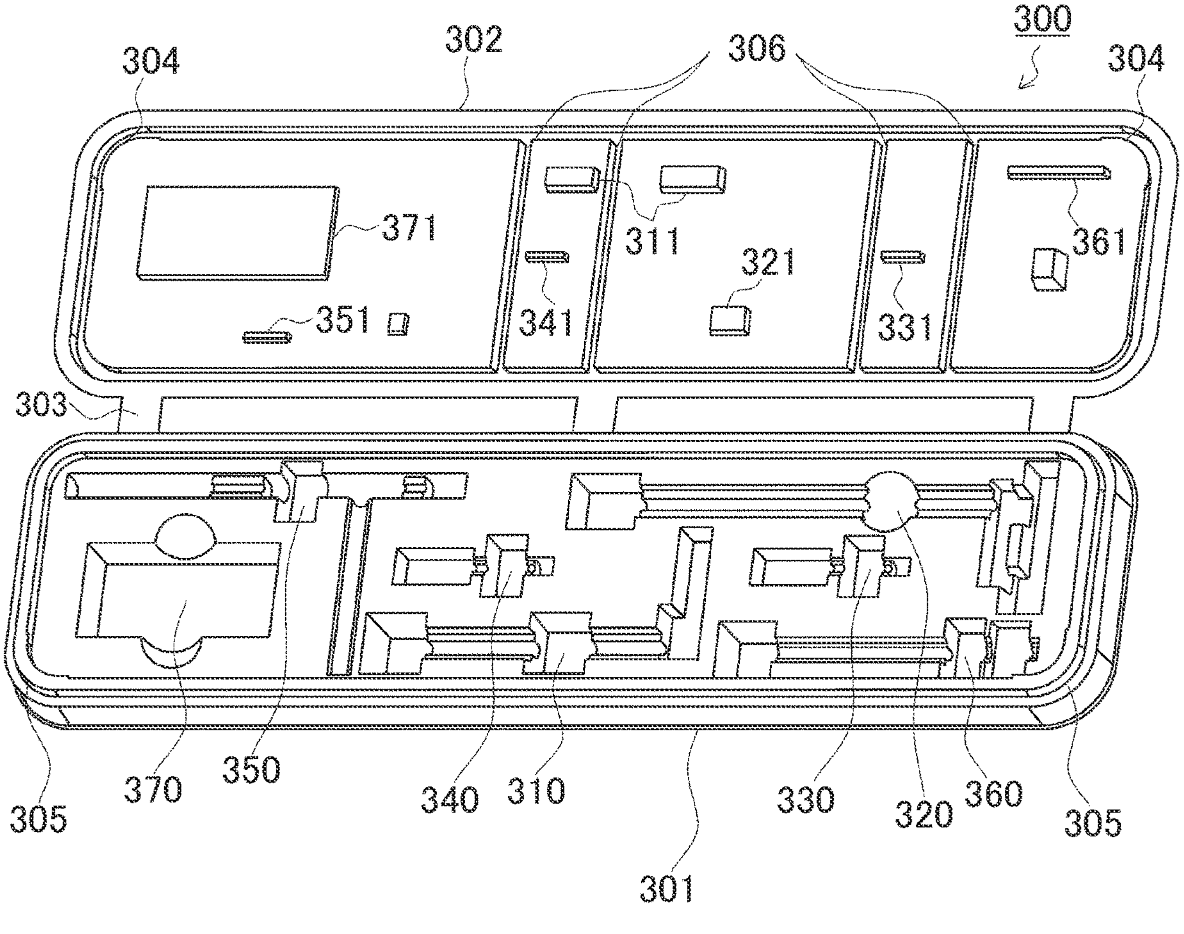
FIG. 3 is a perspective view showing a housing box in a state in which a cover is opened from a base.

Referring to FIG. 3, a housing box 300 in which the various nozzles that are the rod-shaped members are housed will be described. The housing box 300 is formed of a base 301 and a cover 302 that are connected to each other with a hinge 303, for example, which is formed by vacuum forming. Since the housing box 300 is integrally formed, the housing box 300 has members in a uniform thickness, i.e., the member has a recess on the back side where the surface projects, which leads to easy mass production. Moreover, a material whose deformation due to temperature changes at the time of transportation is suppressed, for example, a resin material PS (Poly Styrene) whose heatproof temperature ranges from 70 to 90° C. is used for the housing box 300.

The base 301 is provided with a housing part in a groove shape in which the various nozzles that are rod-shaped members are placed. The housing box 300 is desirably used for the transportation of a large number of rod-shaped members. The base 301 exemplified in FIG. 3 is provided with a first housing part 310 to a seventh housing part 370. Moreover, in order not to become unstable when the housing box 300 is placed on the horizontal plane, a structure may be provided in which the edge of the bottom surface side of the base 301 protrudes in the horizontal direction.

The cover 302 is covered on the base 301 as the hinge 303 is curved, and has a first projection 311 to a seventh projection 371 respectively fit into the first housing part 310 to the seventh housing part 370 when the cover 302 is covered on the base 301. The first projection 311 to the seventh projection 371 contact and press various nozzles placed on the first housing part 310 to the seventh housing part 370. Note that when the cover 302 bends, the positions of the first projection 311 to the seventh projection 371 are sometimes displaced. Therefore, in order to improve the stiffness of the cover 302, a rib 306 may be provided so as to connect the long sides of the cover 302 to each other. Note that the number, position, and shape of the ribs 306 are not limited to the example illustrated in FIG. 3.

Moreover, a fitting part 304 may be provided on a side facing a side connecting the hinge 303 on four sides of the cover 302, and a fitted part 305 may be provided on the base 301 at a position matching the fitting part 304. The fitting part 304 is provided on the cover 302, and the fitted part 305 is provided on the base 301, and thus the base 301 and the cover 302 can be easily locked by covering the cover 302 on the base 301. Note that in order to maintain moderate lock strength and to easily open the housing box by a user with both hands, a set of the fitting part 304 and the fitted part 305 is preferably provided at two corners exemplified in FIG. 3.

Figure 4:
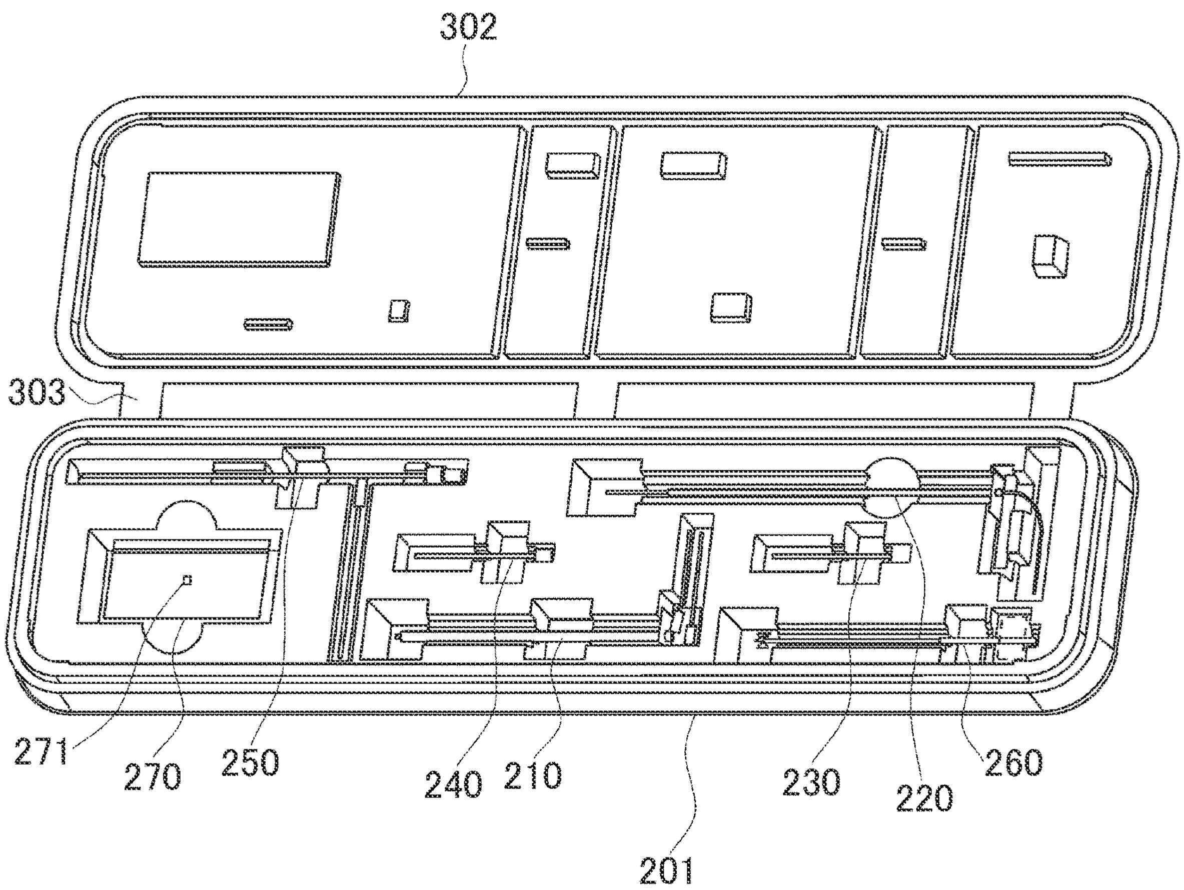
FIG. 4 is a perspective view showing the housing box in a state in which a rod-shaped member is placed.

FIG. 4 illustrates a state where various nozzles that are the rod-shaped members and the like are placed on the first housing part 310 to the seventh housing part 370. The sample dispensing nozzle 210 is placed on the first housing part 310, the reagent dispensing nozzle 220 is placed on the second housing part 320, the liquid dispensing nozzle 230 is placed on the third housing part 330, the buffer solution discharge nozzle 240 is placed on the fourth housing part 340, and the reaction solution dispensing nozzle 250 is placed on the fifth housing part 350. Moreover, a stirring paddle 260 used for stirring the reagent is placed on the sixth housing part 360, and a stock bag 270 containing a stock 271 is placed on the seventh housing part 370.

Figure 5:
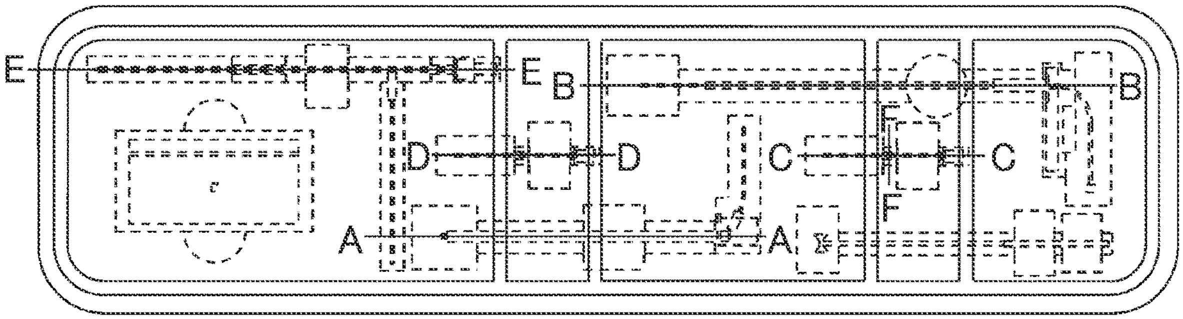
FIG. 5 is a plan view showing in a state in which the housing box the cover is closed on the base.

FIG. 5 illustrates a state where the base 301 is covered with the cover 302 and the cover 302 and the base 301 are locked with a set of the fitting part 304 and the fitted part 305. When the cover 302 and the base 301 are locked, the first projection 311 to the seventh projection 371 are brought into close contact with each other until a gap to the rod-shaped members such as various nozzles placed on the first housing part 310 to the seventh housing part 370 is below the outer diameter of the rod-shaped member, and this suppresses the movement of the rod-shaped members due to vibrations during transport.

Referring to FIG. 6A to FIG. 6E, the first housing part 310 to the fifth housing part 350 will be described. The first housing part 310 exemplified in FIG. 6A, which is a cross-sectional view taken along line A-A in FIG. 5, houses the sample dispensing nozzle 210. The first housing part 310 is separated into a first region 511 to a fifth region 515 from the bottom side along the long direction of the sample dispensing nozzle 210. The first region 511 is a region in which the bending metal plate 213 is housed. The first region 511 is a groove deeper than the adjacent second region 512. The second region 512 is a region in which the sample dispensing nozzle 210 contacts the bottom surface of the first housing part 310 and its movement is suppressed by the first projection 311. The second region 512 is a groove shallower than the adjacent first region 511 and the adjacent third region 513. The third region 513 is a region having a space into which a user can put his/her fingers to pick the sample dispensing nozzle 210. The third region 513 is a groove deeper than the adjacent second region 512 and the adjacent fourth region 514. The space into which the user's fingers are put is provided in a direction orthogonal to the long direction of the sample dispensing nozzle 210. The fourth region 514 is a region in which the sample dispensing nozzle 210 contacts the bottom surface of the first housing part 310 and its movement is suppressed by the first projection 311. The fourth region 514 is a groove shallower than the adjacent third region 513 and the adjacent fifth region 515. The fifth region 515 is a region in which a space is provided between the tip end of the sample dispensing nozzle 210 and the inner wall. The fifth region 515 is a groove deeper than the adjacent fourth region 514. Note that the third region 513 and the fourth region 514 are not necessarily provided.

With such a configuration, the bending metal plate 213 projecting in the radial direction is caught on a step provided between the first region 511 and the second region 512, and thus the space between the tip end of the sample dispensing nozzle 210 and the inner wall of the first housing part 310 is maintained. That is, the tip end of the sample dispensing nozzle 210 is not brought into contact with the inner wall of the first housing part 310, and thus it is possible to prevent the breakage of the sample dispensing nozzle 210 at the time of transportation.

Note that the sample dispensing nozzle 210 whose movement is suppressed by the first projection 311 remains in contact with the bottom surface of the first housing part 310 in the second region 512, and thus it is possible to prevent the bending metal plate 213 from coming off from the step between the first region 511 and the second region 512. Moreover, the step between the first region 511 and the second region 512 is preferably greater than the height of the bending metal plate 213 projecting in the radial direction.

Figure 6A:
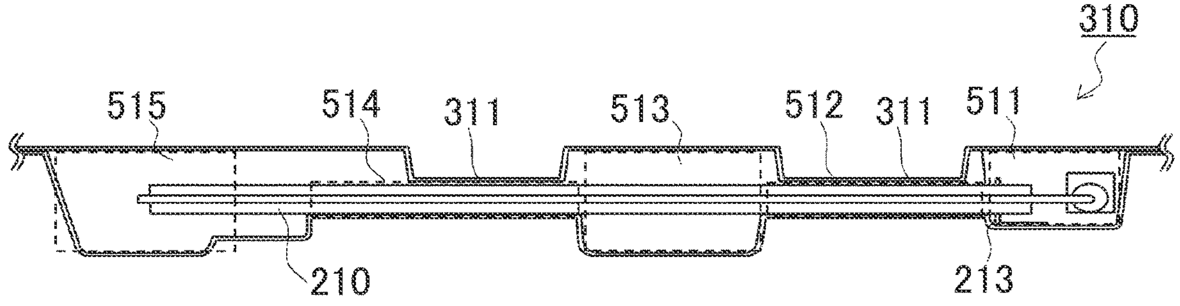
FIG. 6A is a cross sectional view illustrating the housing part of the sample dispensing nozzle.
Figure 6B:
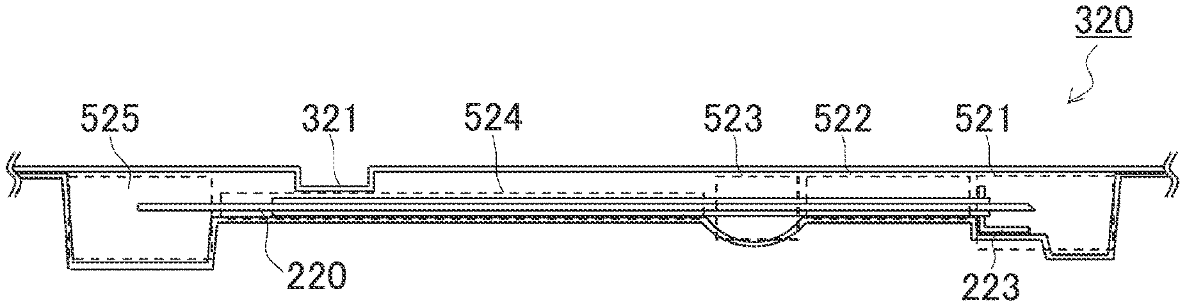
FIG. 6B is a cross sectional view illustrating the housing part of the reagent dispensing nozzle.

The second housing part 320 exemplified in FIG. 6B, which is a cross-sectional view in FIG. 5 B-B, houses the reagent dispensing nozzle 220. The second housing part 320 is separated into a first region 521 to a fifth region 525 similar to the first housing part 310. The first region 521 is a region in which the bending metal plate 223 is housed. The first region 521 is a groove deeper than the adjacent second region 522. The second region 522 is a region in which the reagent dispensing nozzle 220 contacts the bottom surface of the second housing part 320. The second region 522 is a groove shallower than the adjacent first region 521 and the adjacent third region 523. The third region 523 is a region having a space into which a user can put his/her fingers to pick the reagent dispensing nozzle 220. The third region 523 is a groove deeper than the adjacent second region 522 and the adjacent fourth region 524. The fourth region 524 is a region in which the reagent dispensing nozzle 220 contacts the bottom surface of the second housing part 320 and its movement is suppressed by the second projection 321. The fourth region 524 is a groove shallower than the adjacent third region 523 and the adjacent fifth region 525. The fifth region 525 is a region in which a space is provided between the tip end of the reagent dispensing nozzle 220 and the inner wall. The fifth region 525 is a groove deeper than the adjacent fourth region 524.

With such a configuration, the bending metal plate 223 is caught on a step provided between the first region 521 and the second region 522 similar to the first housing part 310, and thus the tip end of the reagent dispensing nozzle 220 is not necessarily contacted with the inner wall of the second housing part 320. Accordingly, it is possible to prevent the breakage of the reagent dispensing nozzle 220 at the time of transportation.

Figure 6C:
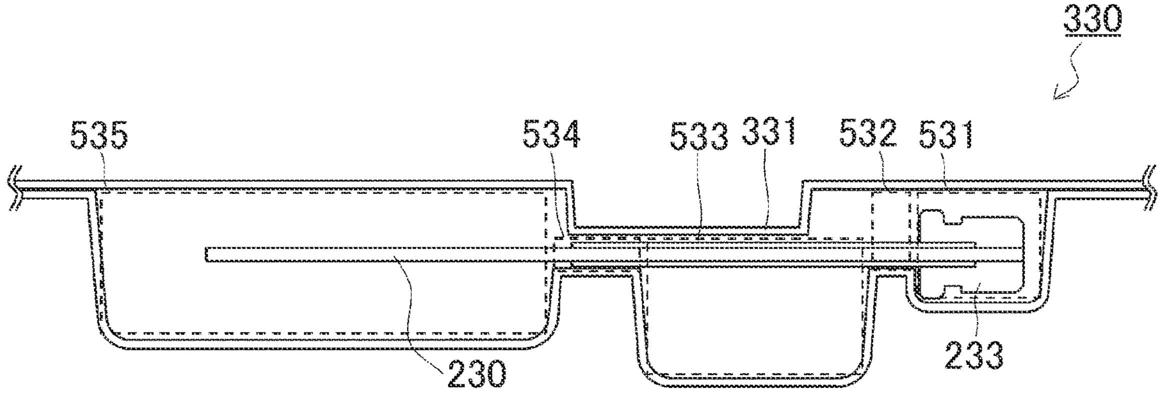
FIG. 6C is a cross sectional view illustrating the housing part of the liquid aspiration nozzle.

The third housing part 330 exemplified in FIG. 6C, which is a cross-sectional view taken along line C-C in FIG. 5, houses the liquid dispensing nozzle 230. The third housing part 330 is separated into a first region 531 to a fifth region 535 similar to the first housing part 310. The first region 531 is a region in which the flange part 233 is housed. The first region 531 is a groove deeper than the adjacent second region 532. The second region 532 is a region in which the liquid dispensing nozzle 230 contacts the bottom surface of the third housing part 330. The second region 532 is a groove shallower than the adjacent first region 531 and the adjacent third region 533. The third region 533 is a region having a space into which a user can put his/her fingers to pick the liquid dispensing nozzle 230. The third region 533 is a groove deeper than the adjacent second region 532 and the adjacent fourth region 534. The fourth region 534 is a region in which the liquid dispensing nozzle 230 contacts the bottom surface of the third housing part 330 and its movement is suppressed by the third projection 331. The fourth region 534 is a groove shallower than the adjacent third region 533 and the adjacent fifth region 535. The fifth region 535 is a region in which a space is provided between the tip end of the liquid dispensing nozzle 230 and the inner wall. The fifth region 535 is a groove deeper than the adjacent fourth region 534.

With such a configuration, the flange part 233 projecting in the radial direction is caught on a step provided between the first region 531 and the second region 532, and the tip end of the liquid dispensing nozzle 230 is not necessarily contacted with the inner wall of the third housing part 330, and thus it is possible to prevent the breakage of the liquid dispensing nozzle 230 at the time of transportation.

Figure 6D:
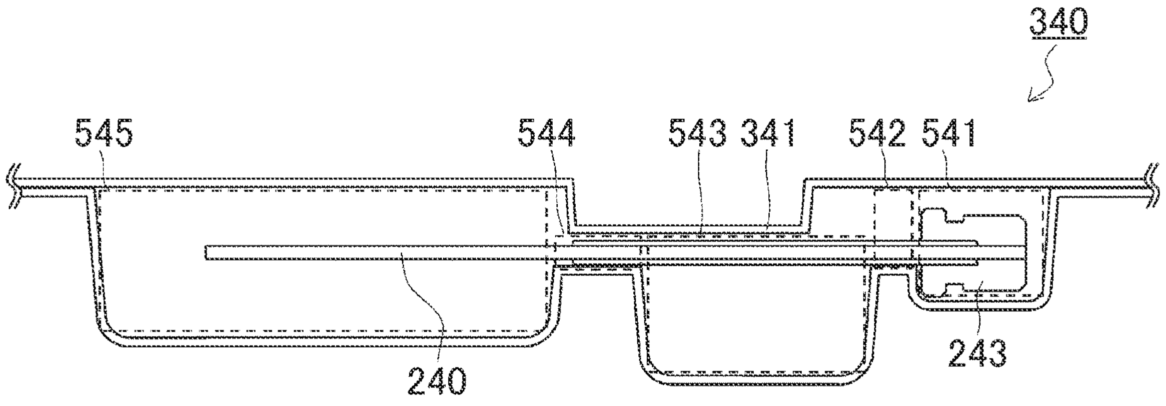
FIG. 6D is a cross sectional view illustrating the housing part of the buffer solution discharge nozzle.

The fourth housing part 340 exemplified in FIG. 6D, which is a cross-sectional view taken along line D-D in FIG. 5, houses the buffer solution discharge nozzle 240. The fourth housing part 340 is separated into a first region 541 to a fifth region 545 similar to the first housing part 310. The first region 541 is a region in which the flange part 243 is housed. The first region 541 is a groove deeper than the adjacent second region 542. The second region 542 is a region in which the buffer solution discharge nozzle 240 contacts the bottom surface of the fourth housing part 340. The second region 542 is a groove shallower than the adjacent first region 541 and the adjacent third region 543. The third region 543 is a region having a space into which a user can put his/her fingers to pick the buffer solution discharge nozzle 240. The third region 543 is a groove deeper than the adjacent second region 542 and the adjacent fourth region 544. The fourth region 544 is a region in which the buffer solution discharge nozzle 240 contacts the bottom surface of the fourth housing part 340 and its movement is suppressed by the fourth projection 341. The fourth region 544 is a groove shallower than the adjacent third region 543 and the adjacent fifth region 545. The fifth region 545 is a region in which a space is provided between the tip end of the buffer solution discharge nozzle 240 and the inner wall. The fifth region 545 is a groove deeper than the adjacent fourth region 544.

With such a configuration, the flange part 243 is caught on a step provided between the first region 541 and the second region 542 similar to the third housing part 330, and the tip end of the buffer solution discharge nozzle 240 is not allowed to contact the inner wall of the fourth housing part 340, and thus it is possible to prevent the breakage of the buffer solution discharge nozzle 240 at the time of transportation.

Figure 6E:
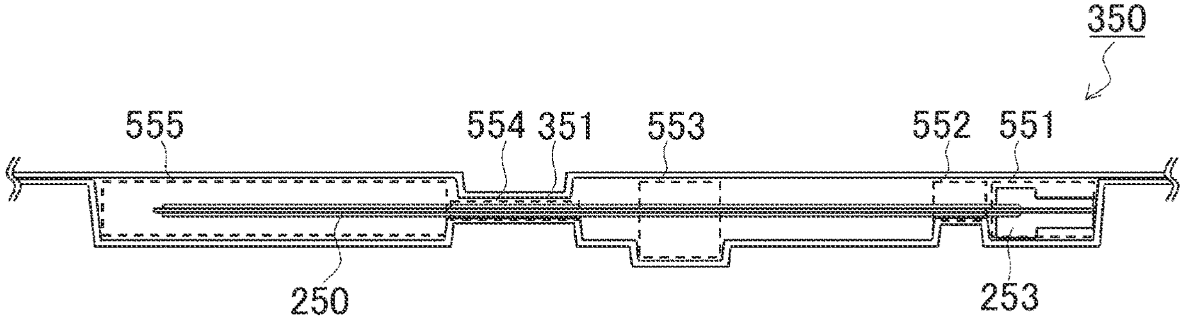
FIG. 6E is a cross sectional view illustrating the housing part of the reaction solution aspiration nozzle.

The fifth housing part 350 exemplified in FIG. 6E, which is a cross-sectional view taken along line E-E in FIG. 5, houses the reaction solution dispensing nozzle 250. The fifth housing part 350 is separated into a first region 551 to a fifth region 555 similar to the first housing part 310. The first region 551 is a region in which the flange part 253 is housed. The first region 551 is a groove deeper than the adjacent second region 552. The second region 552 is a region in which the reaction solution dispensing nozzle 250 contacts the bottom surface of the fifth housing part 350. The second region 552 is a groove shallower than the adjacent first region 551 and the adjacent third region 553. The third region 553 is a region having a space into which a user can put his/her fingers to pick the reaction solution dispensing nozzle 250. The third region 553 is a groove deeper than the adjacent second region 552 and the adjacent fourth region 554. The fourth region 554 is a region in which the reaction solution dispensing nozzle 250 contacts the bottom surface of the fifth housing part 350 and its movement is suppressed by the fifth projection 351. The fourth region 554 is a groove shallower than the adjacent third region 553 and the adjacent fifth region 555. The fifth region 555 is a region in which a space is provided between the tip end of the reaction solution dispensing nozzle 250 and the inner wall. The fifth region 555 is a groove deeper than the adjacent fourth region 554.

With such a configuration, the flange part 253 is caught on a step provided between the first region 551 and the second region 552 similar to the third housing part 330, and the tip end of the reaction solution dispensing nozzle 250 is not allowed to contact the inner wall the fifth housing part 350, and thus it is possible to prevent the breakage of the reaction solution dispensing nozzle 250 at the time of transportation.

Figure 7:
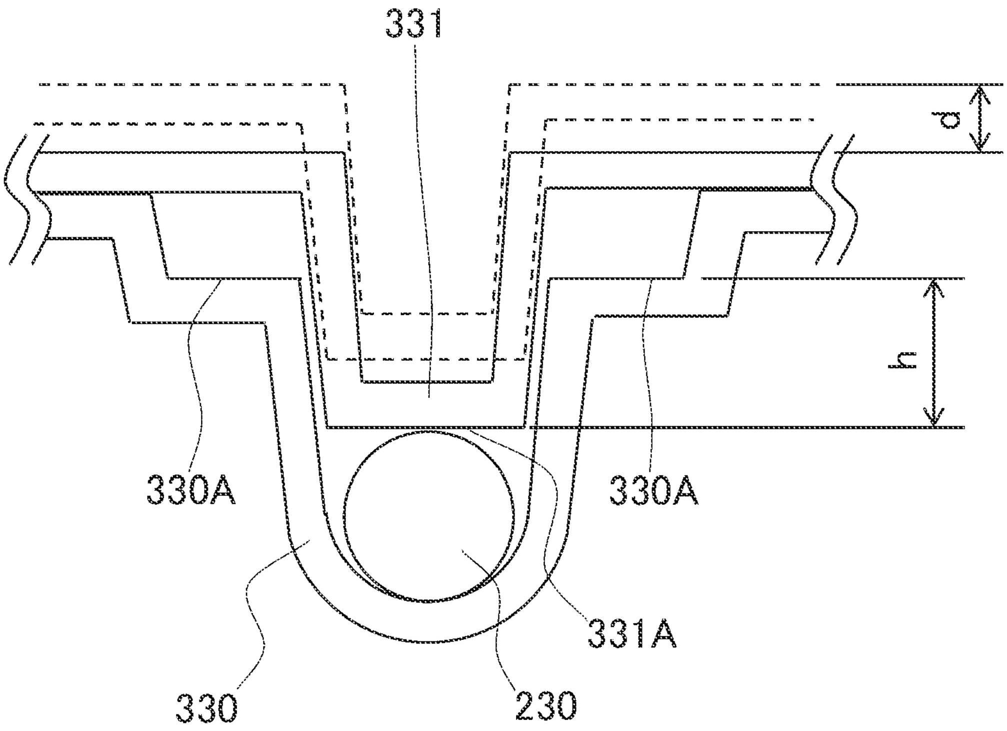
FIG. 7 is a cross sectional view illustrating the positional relationship between the projection of the cover and the housing part of the base.

Referring to FIG. 7, the positional relationship between the housing part provided on the base 301 and the projection provided on the cover 302 in the height direction will be described. Note that FIG. 7 is a cross-sectional view taken along line F-F in FIG. 5. The positional relationship will be described using the third housing part 330 in which the liquid dispensing nozzle 230 is housed as an example of the housing part, and using the third projection 331 housed in the third housing part 330 as an example of the projection.

On the side of the groove of the third housing part 330, a flat surface 330A is formed in the convenience of manufacture. Moreover, the third projection 331 has a tip end face 331A in contact with the liquid dispensing nozzle 230. The third housing part 330 and the third projection 331 are formed such that h>d is held where a distance from the flat surface 330A to the tip end face 331A is h and the floating amount of the cover 302 is d. With such a configuration, a gap through which the liquid dispensing nozzle 230 passes, i.e., a gap greater than the outer diameter of the liquid dispensing nozzle 230 is not generated between the third housing part 330 and the third projection 331. Furthermore, the gap between the third projection 331 and the liquid dispensing nozzle 230 is below the outer diameter of the liquid dispensing nozzle 230. As a result, it is possible to prevent the movement of the liquid dispensing nozzle 230 by the third projection 331.

As described above, the embodiment of the present invention has been described. The present invention is not limited to the foregoing embodiment. The components may be modified within the scope not deviating from the gist of the invention. Moreover, a plurality of components disclosed in the foregoing embodiment may be appropriately combined. Furthermore, some components may be removed from all the components illustrated in the foregoing embodiment.

LIST OF REFERENCE SIGNS

100: automatic analyzer
101: sample container
102: sample transport unit
103: reagent container
104: reagent disk
105: sample dispensing unit
106: reagent dispensing unit
107: reaction disk
108: measuring unit
109: reaction container transport unit
110: sample aspiration position
111: consumable item storing unit
112: consumable item transport unit
113: control unit
114: pre-processing unit
115: pre-processing position
116: stirring position
117: reaction solution dispensing position
118: waste hole
119: reagent stirring unit
210: sample dispensing nozzle
211: nozzle main body
212: protection part
213: bending metal plate
220: reagent dispensing nozzle
221: nozzle main body
222: protection part
223: bending metal plate
230: liquid dispending nozzle
231: nozzle main body
232: protection part
233: flange part
240: buffer solution discharge nozzle
241: nozzle main body
242: protection part
243: flange part
250: reaction solution dispending nozzle
251: nozzle main body
252: protection part
253: flange part
260: stirring paddle
270: stock bag
271: stock
300: housing box
301: base
302: cover
303: hinge
304: fitting part
305: fitted part
306: rib
310: first housing part
311: first projection
320: second housing part
321: second projection
330: third housing part
330A: flat surface
331: third projection
331A: tip end face
340: fourth housing part
341: fourth projection
350: fifth housing part
351: fifth projection
360: sixth housing part
361: sixth projection
370: seventh housing part
371: seventh projection
511: first region
512: second region
513: third region
514: fourth region
515: fifth region
521: first region
522: second region
523: third region
524: fourth region
525: fifth region
531: first region
532: second region
533: third region
534: fourth region
535: fifth region

541: first region
542: second region
543: third region
544: fourth region
545: fifth region
551: first region
552: second region
553: third region
554: fourth region
555: fifth region

The invention claimed is:

1. A housing box in which a rod-shaped member used for an automatic analyzer is housed, the housing box comprising:

a base provided with a housing part in a groove shape on which the rod-shaped member is disposed; and a cover connected to the base via a hinge, the cover covering the base, wherein the groove shape of the housing part includes:

a first groove region, a second groove region, a third groove region and a fourth groove region, which each have different depths in a depth direction, the third groove region being between the fourth groove region and second groove region in a longitudinal direction of the rod-shaped member, and the second groove region having a depth deeper than respective depths of the first groove region, the third groove region and the fourth groove region; and a step, between the first groove region and the second groove region, on which a projection of the rod-shaped member is caught and which contacts the projection of the rod-shaped member, the projection of the rod-shaped member being in a radial direction with respect to a rod of the rod-shaped member and is provided on an opposite side of the rod-shaped member than a tip end of the rod-shaped member, wherein the housing part includes a space, within the fourth groove region, that is between the tip end of the rod-shaped member and an inner wall of the housing part within the fourth groove region, the contact of the projection of the rod-shaped member and the step preventing movement of the tip end of the rod-shaped member toward the inner wall of the housing part of the fourth groove region, wherein the cover has a projection that projects in the depth direction and which spans at least over the third groove region and contacts the rod-shaped member.

2. The housing box according to claim 1, wherein the cover has two fitting parts that fit in the base upon closing of the cover.

3. The housing box according to claim 1, wherein a height dimension of the step is greater than a radial dimension of the projection of the rod-shaped member.

4. The housing box according to claim 1, wherein the housing part has a space confiqured to accommodate entering in a direction orthogonal to the longitudinal direction of the rod-shaped member.

5. The housing box according to claim 1, wherein the base is provided with a plurality of the housing parts.

6. The housing box according to claim 1, wherein the cover is essentially rectangular having two long sides extending in a longitudinal direction, and wherein the cover is provided with a rib perpendicular to the longitudinal direction connecting the two long sides of the cover.

7. The housing box according to claim 1, wherein the base and the cover are integrally formed by a vacuum forming method together with a hinge connecting the base to the cover.

* * * * *